(12) United States Patent
Moyer

(10) Patent No.: US 8,984,344 B2
(45) Date of Patent: Mar. 17, 2015

(54) STACK-BASED TRACE MESSAGE GENERATION FOR DEBUG AND DEVICE THEREOF

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 298 days.

(21) Appl. No.: 13/369,563

(22) Filed: Feb. 9, 2012

(65) Prior Publication Data

US 2013/0212438 A1 Aug. 15, 2013

(51) Int. Cl.
*G06F 11/00* (2006.01)
(52) U.S. Cl.
USPC ............................................ 714/37; 714/38.1
(58) Field of Classification Search
CPC ..................................................... G06F 11/36
USPC ...................................... 714/38.1, 37, 20, 30
See application file for complete search history.

(56) References Cited

U.S. PATENT DOCUMENTS

| 6,732,307 | B1* | 5/2004 | Edwards ......................... 714/724 |
| 6,751,789 | B1 | 6/2004 | Berry et al. |
| 7,149,926 | B2* | 12/2006 | Ahmad et al. .................. 714/30 |
| 7,984,220 | B2 | 7/2011 | Gerard et al. |
| 2003/0051122 | A1* | 3/2003 | Sato ............................. 712/227 |
| 2004/0268096 | A1* | 12/2004 | Master et al. ................. 712/227 |
| 2006/0075310 | A1* | 4/2006 | Tagawa ........................... 714/45 |

FOREIGN PATENT DOCUMENTS

WO  2011/039570 A1  4/2011

\* cited by examiner

*Primary Examiner* — Dieu-Minh Le

(57) ABSTRACT

During a debug mode of operation of a data processor it is determined whether a data access request is to a stack of the data processor. If not, a data trace message based on the data access request is generated for transmission to a debugger so long as an address being accessed by data access request meets a predefined address range criteria. Otherwise, if the data access request is to the stack of the data processor, a data trace message based on the data access request is prevented from being generated for transmission to the debugger regardless the predefined address range criteria.

20 Claims, 4 Drawing Sheets

|    | T_R/W   | DARS   | DARE   | RC   | SAF   |
|----|---------|--------|--------|------|-------|
| 81 → | T_R/W_1 | DARS_1 | DARE_1 | RC_1 | SAF_1 |
| 82 → | T_R/W_2 | DARS_2 | DARE_2 | RC_2 | SAF_2 |
| 83 → | T_R/W_3 | DARS_3 | DARE_3 | RC_3 | SAF_3 |

US 8,984,344 B2

STACK-BASED TRACE MESSAGE GENERATION FOR DEBUG AND DEVICE THEREOF

BACKGROUND

1. Field of the Disclosure

This disclosure relates generally to semiconductors, and more specifically, to data processors that implement a debug mode of operation.

2. Description of the Related Art

An IEEE standard known as IEEE ISTO5001, or the Nexus debug standard, is an established real-time debug standard that supports real-time debug message generation. The Nexus debug standard specifies a mechanism for identifying to an external trace reconstruction tool a predetermined operating condition within the system. Debugging processes are also used in the development of code for a data processing system. Providing debug information in real-time, without intrusion on the normal operation of the data processing system, is highly desirable to remain transparent to operation of the system.

Debug messages include trace messages that are generated by the data processing system. Trace messages can contain address and data information for either program events (program trace messaging) that relate to the execution sequence of instructions, or for data events (data read/write messaging) that relate to the access of information based upon the execution of instructions. The address information is typically virtual address information that must be translated to identify a physical memory location known as a physical address. An issue arises when the amount of trace messaging information overruns buffer space used to store the trace messages prior to being transmitted to a debug tool.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

During a debug mode of operation of a data processor it is determined whether a data access request is to a memory stack area of the data processor (a stack access). If not, a data trace message based on the data access request is generated for transmission to a debugger so long as an address being accessed by the data access request meets a predefined address range for which data trace messages are to be generated. Otherwise, if the data access request is a processor stack access, a data trace message based on the data access request is prevented from being generated for transmission to the debugger regardless of the predefined address range criteria. Various aspects of the present disclosure will be better understood with reference to FIGS. 1-5 discussed below.

Figure 1:
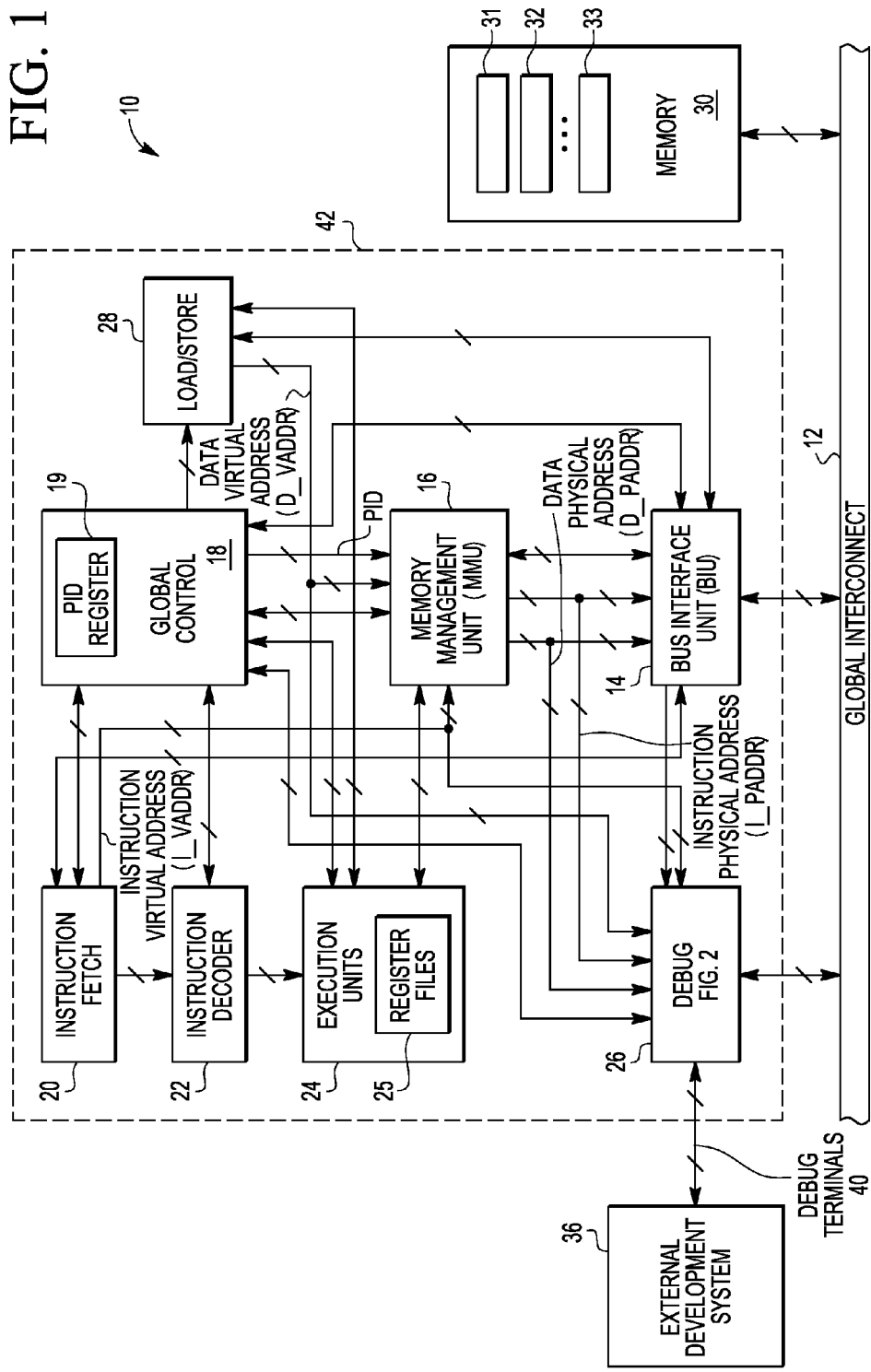
FIG. 1 illustrates in block diagram form a data processing system having debug message generation in accordance with a specific embodiment of the present disclosure.

Illustrated in FIG. 1 is a data processing system 10 that supports trace messaging during a debug mode of operation. Within data processing system 10 is a global interconnect 12. In one form global interconnect 12 is a system bus. Other forms of interconnects may be used including, for example, crossbars, point-to-point connections, and optical and wireless transmission techniques. A bus interface unit (BIU) 14 is connected to global interconnect 12 via a bidirectional coupling. In one form the bidirectional coupling is a bidirectional multiple conductor bus wherein multiple conductor buses herein are represented with a slash across the conductor. BIU 14 is connected to memory management unit (MMU) 16. MMU 16 is connected to an input/output terminal of a global control circuit 18 via a bidirectional multiple conductor bus. Another input/output terminal of global control circuit 18 is connected to an input/output terminal of an instruction fetch unit 20 via a bidirectional multiple conductor bus. Instruction fetch unit 20 has an output connected to an input of an instruction decoder 22 via a multiple conductor bus. An output of instruction decoder 22 is connected to an input of execution units 24.

In one form execution units 24 include at least one arithmetic logic unit, at least one floating point unit and at least one multiplier circuit. Within the execution units 24 are register files 25. An input/output terminal of instruction decoder 22 is connected to another input/output terminal of the global control circuit 18. An input/output terminal of execution units 24 is connected to a fourth input/output terminal of global control circuit 18. Execution units 24 and instruction fetch unit 20 are also connected to MMU 16. Debug module 26 includes trace message request logic 62 (see FIG. 2) and has an input/output terminal connected to an input/output terminal of global control circuit 18.

A load/store unit 28 has an input/output terminal connected to an input/output terminal of global control circuit 18. Load/store unit 28 has a second input/output terminal connected to another input/output terminal of BIU 14. Load/store unit 28 has an input/output terminal connected to a second input/output terminal of execution units 24. A second input/output terminal of BIU 14 is connected to a seventh input/output terminal of global control circuit 18. An output of load/store unit 28 provides a data virtual address (D_VADDR) and is connected to an input of MMU 16 and an input of debug module 26. An output of instruction fetch unit 20 provides an instruction virtual address (I_VADDR) and is connected to a second input of MMU 16 and a second input of debug module 26. An output of MMU 16 provides a data physical address (D_PADDR) and is connected to an input of BIU 14 and to an input of debug module 26. A second output of MMU 16 provides an instruction physical address (I_PADDR) and is connected to a second input of BIU 14 and to an input of debug module 26.

A memory 30 is connected to global interconnect 12 via a bidirectional coupling. Debug module 26 has a second input/output terminal connected to a plurality of debug terminals 40 via bidirectional multiple conductors. The plurality of debug terminals 40 are connected to an external development system 36 that is an external debug tool commonly referred to as a debugger or external debugger. In the illustrated form BIU 14, MMU 16, global control circuit 18, instruction fetch unit 20, instruction decoder 22, execution units 24 with register files 25, debug module 26 and load/store unit 28 collectively form a data processor 42 as indicated by the dashed line grouping in FIG. 1. While global control circuit 18 is illustrated in FIG. 1 in a segregated location, it should be well understood that the module and functional control of global control circuit 18, as well as that of other modules, may also be implemented in a distributed manner and be included within any of the various other system blocks of data processing system 10. For example, the storage locations 602 illustrated at the debug control module 60 of FIG. 3 can include register fields that are part of control circuit 18 and register files 25. Also, in the illustrated embodiment, global control 18 includes a process identifier (PID) register 19 that stores a process identifier (PID) for the currently executing process, also referred to as a thread. Global control 18 also provides the PID to MMU 16.

In operation, data processing system 10 communicates with devices connected to global interconnect 12, including devices not illustrated. Information communicated with data processor 42 transfers through BIU 14. Instruction fetch unit 20 retrieves data processor instructions (i.e. processor instructions) from BIU 14 under control of global control circuit 18. The retrieved instructions are sequentially communicated to instruction decoder 22 for decoding under control of global control circuit 18. Execution units 24 execute instructions and generate data that is either stored in a cache (not shown) or placed in the memory 30 under the control of global control circuit 18, BIU 14 and global interconnect 12. Specific memory locations 31 through 33 are illustrated, and represent areas of memory 30, or other storage locations, where the data processing device 10 has allocated memory stack space, such as a supervisor stack and a user stack for one or more threads. It will be appreciated that there may be some memory space left between memory stacks, and each memory stack, upon allocation, will occupy a determined size of memory.

Debugging of the operation of data processor 42 and data processing system 10 is performed by the use of debug module 26 that monitors operation of the data processing system 10 and generates debug messages for analysis by external development system 36. A test or debug mode of operation is entered in response to activation of such from external development system 36. In the illustrated form, debug module 26 is configured to receive data virtual addresses, data physical addresses, instruction virtual addresses, instruction physical addresses, data information from BIU 14 and load/store unit 28, and information from global control 18. A data address is an address where data resides whereas an instruction address is an address where an instruction resides. Instruction virtual addresses are provided from instruction fetch unit 20 to the debug module 26 and MMU 16. A virtual address is an un-translated address which requires some further processing or translating to obtain a translated address of the physical storage location where the information is residing. This translated address is referred to as the physical address. MMU 16 provides instruction physical addresses to BIU 14 and debug module 26 by translating addresses of virtual pages of memory to corresponding physical page addresses. Pages of memory are contiguous locations which are grouped, and typically have a size that is a power of 2, such as for example a 4 Kbyte page, a 16 Kbyte page, a 64 Kbyte page, etc. Load/store unit 28 provides data virtual addresses to debug module 26 and to MMU 16. MMU 16 provides data physical addresses to BIU 14 and debug module 26. Debug module 26 forms a debug message for external development system 36 based upon information at one or more of the received addresses. Two types of messages include Program Trace Messages (PTMs) and Data Trace Messages (DTMs). PTMs provide information related to the execution of instructions, such as changes in program flow; while DTMs provide data information, such as the value of operands being accessed from various memories.

Figure 2:
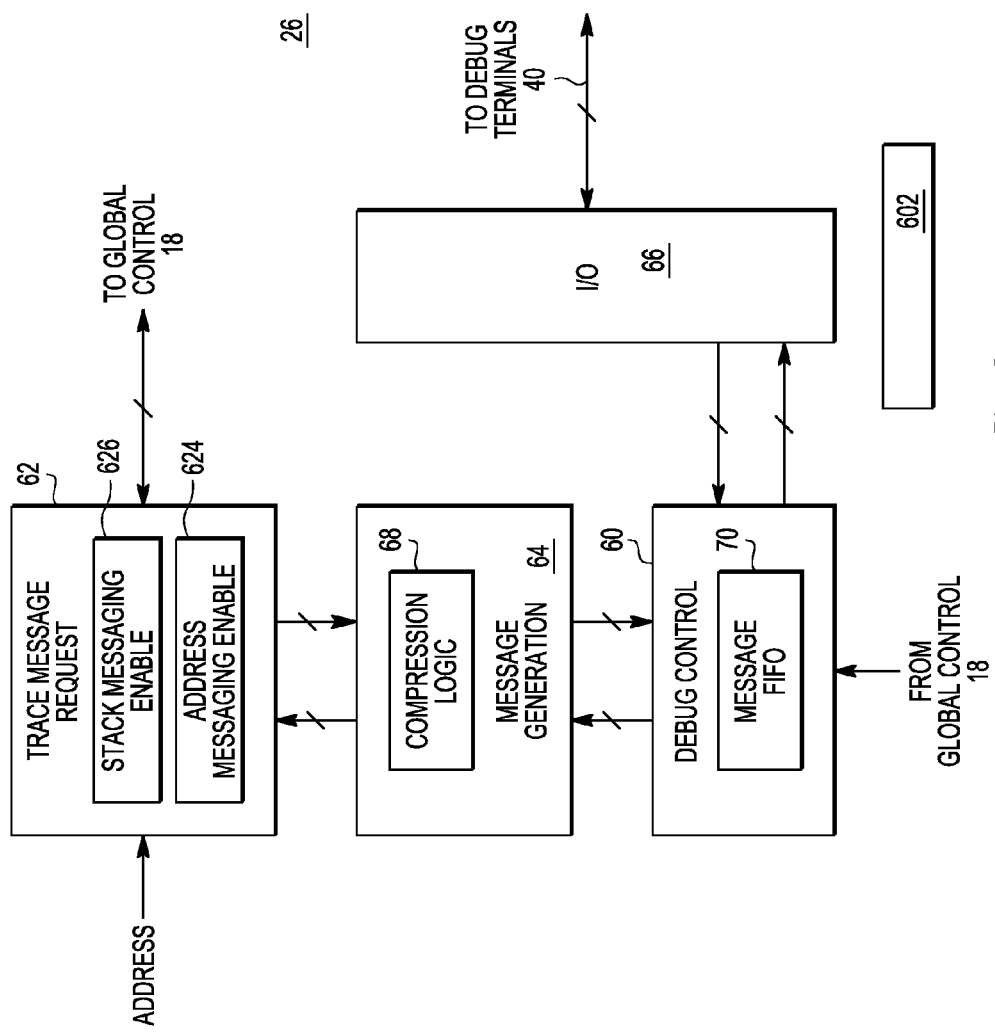
FIG. 2 illustrates in block diagram form a debug module of FIG. 1 in accordance with a specific embodiment of the present disclosure.

Illustrated in FIG. 2 is an exemplary embodiment of a portion of the debug module 26 of FIG. 1 that includes debug control module 60, trace message request module 62, message generation module 64, storage locations 602 and input/output (I/O) module 66. Debug control module 60 includes a first-in first-out storage circuit (FIFO) 70 and is connected to message generation module 64 and I/O module 66. Debug control module 60 also receives information from global control circuit 18, register files 25, other portions of the data processing system 10, storage location 602, and the like. Storage location 602 can represent a portion of the registers implemented at register files 25, or elsewhere at data processing system 10. I/O module 66 is connected to debug terminals 40. Trace message request module 62 is connected to global control 18, and to receive various address information (ADDRESS), such as instruction physical address (I_PADDR), instruction virtual address (I_VADDR), data physical addresses (D_PADDR), and instruction virtual address (I_VADDR). Trace message request module 62 is connected to message generation module 64, and includes address messaging enable module 624 that determines when an address of a data access request meets a criteria based upon a predefined address range, and a stack messaging enable module 626 that determines when a stack access of data processor system 10 has occurred.

During debug operation, trace message request module 62 is the logic module that determines when a trace message is to be generated by message generation module 64. Message generation module 64 generates debug messages, such as Program Trace Messages (PTMs) and Data Trace Messages (DTMs), based on a message generation request from trace message request module 62. Compression module 68 may perform message compression on parts or all of the messages generated by message generation module 64. Generated messages are provided to debug control module 60 where they are stored in message FIFO 70 before being transmitted. From message FIFO 70, the debug messages are routed to debug terminals 40 via I/O module 66.

Figures 3, 4:
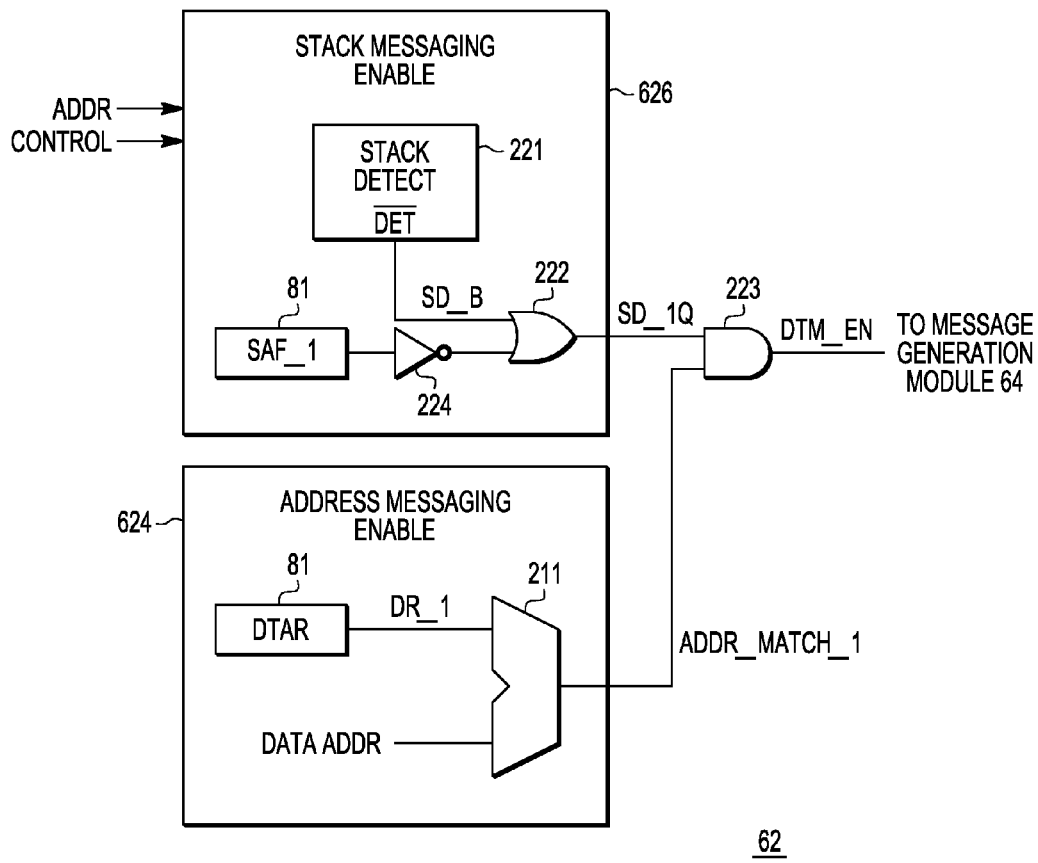
FIG. 3 illustrates in block diagram form a set of register information used by the debug module of FIG. 2 accordance with a specific embodiment of the present disclosure.
FIG. 4 illustrates in block diagram form a portion of FIG. 2 in greater detail in accordance with a specific embodiment of the present disclosure.

In one embodiment, trace message request module 62 includes a plurality of detect modules, including an address messaging enable module 624 and a stack messaging enable module 626 that are used determine whether a trace message is to be generated. In particular, the stack messaging enable module 626 and the address messaging enable module 624 are used to determine whether a data trace message is to be generated. Operation of the detect modules of trace message request module 62 can be controlled by values stored the set of registers 602, a portion of which are illustrated at FIG. 3. In particular, FIG. 3 illustrates three Data Trace Address Registers 81-83, that are also referred to herein as registers 81-83, and DTAR registers 81-83.

It will be appreciated that three DTAR registers are illustrated by way of example, and that additional or fewer DTAR registers may be used. Each DTAR register includes fields that can be programmed with information indicating a corresponding data address range that can be used to enable (or alternatively, in a different control mode determined by settings in registers 81-83, disable) generation of a DTM during debug operation. For example, the address messaging enable module 624 can determine whether a current data access request meets an access range criteria defined by address ranges stored at registers 81-83. In the particular embodiment illustrated, each DTAR register includes fields T_R/W, DARS, DARE, RC, and SAR. Fields DARS and DARE store information that indicates a starting address value and an ending address value, respectively, of an address range. Field T_R/W stores a value that indicates which access types, e.g., read and write accesses, are selected for tracing by a particular DTAR. Thus field T_R/W of a particular DTAR indicates the type of access requests for which the DTAR is enabled to generate, or disabled from generating, a DTM.

According to one embodiment, the value T_R/W is a two-bit value that enables or disables DTM generation for a current data access request based upon the address range specified at register 81 as follows: a first value of T_R/W disables a DTM message from being generated regardless of the address or type of a current access request; a second value of T_R/W enables DTM generation based upon the address of a write access request to a corresponding DTAR address range; a third value of T_R/W enables DTM generation based upon the address of a read access request to a corresponding DTAR address range; a third value of T_R/W enables DTM generation based upon the address of either a read or write access request to a corresponding DTAR address range.

When DTM generation is enabled, based upon the T_R/W register, a value stored at field RC of each DTAR is used to indicate whether the specified address range of a DTAR is satisfied in response to a data access having an address within the DTAR address range or outside the DTAR address range. Thus, the address messaging enable module 624 can use the information stored at each one of the DTARs to generate a DTM for a particular data access request.

Each one of the DTARs 81-83 further includes a register labeled SAF (Stack Access Filtering) that when asserted results in DTM generation based upon the address range of a particular DTAR being disabled for of stack accesses; conversely, DTM generation based upon the address range of a particular DTAR will be enabled for stack accesses if the SAF of the DTAR is negated, irrespective of the address range of the DTAR. For convenience, the data stored at registers 81-83 is referred to by the field name at which it is stored and a suffix corresponding the unit's digit of the reference number of its corresponding DTAR. For, example, the data stored at register 81 is labeled T_R/W_1, DARS_1, DARE_1, RC_1, and SAF_1.

By example, the SAF field of register 81 stores a value, labeled SAF_1. When negated, e.g., a logic zero, SAF_1 indicates that the corresponding address range of register 81 is used to determine if a DTM is to be generated for a stack access, just as for a non-stack access; otherwise, when asserted, e.g., a logic one, SAF_1 will prevent a DTM based upon DTAR 81 from being generated for a stack access regardless of the corresponding address range of register 81, e.g., an access request to the memory stack is not subject to further qualification based upon the address range register 81.

FIG. 4 illustrates a block diagram of a portion of the trace message request module 62 in accordance with a specific embodiment of the present disclosure, including portions of the address messaging enable module 624 and the stack messaging enable module 626. For convenience, the various features and operation of the trace message request module 62 are discussed with reference to register 81.

The address messaging enable module 624 determines whether the address of a current data access request meets the address range criteria of register 81. If so, a signal labeled ADDR_MATCH_1 is asserted, e.g., a logic high value; otherwise the signal ADDR_MATCH_1 is negated. In particular, the address messaging enable module 624 includes a comparator 211 that receives information from the register 81, e.g., DARS_1, DARE_1, T_R/W_1, and RC_1, to determine whether the address (DATA ADDR) of the current data access request is within the data range indicated at register 81, and is of an access type, e.g., read or write access, enabled for messaging. For convenience, only a signal labeled DR_1 is illustrated as being provided to the comparator 211, where DR_1 represents the data range stored at register 81. It will be appreciated however, that other information, such as the value of the range control field (RC) and of the T_R/W field, are also used by comparator 211.

The stack messaging enable module 626 includes a stack detect module 221 a logic OR 222, and an logic INVERTER 224. Logic OR 222 has an input connected to the stack detect module 221 to receive a signal SD_B, and an input connected to the logic INVERTER 224 to receive an inverted value of SAF_1 stored at register 81.

In operation, stack detect module 221 asserts a signal labeled SD_B, e.g., provides a logic low value, at an output DET_B, if it is determined that a current access request is to a memory stack of the data processing system 10, e.g., a stack access. Otherwise, stack detect module 624 negates signal SD_B, e.g., provides a logic high value. Because the stack messaging enable module 626 operates to control how access requests to memory stack locations of memory are handled, a negated value of SD_B (logic high), which indicates the current access request is not to a memory stack, results in the logic OR 222 asserting (logic high) signal SD_1Q to enable generation of a DTM based upon the address range criteria of the address messaging detect module 624.

Therefore, in response to the current access request being a stack access, which results in an asserted value of SD_B (logic low), the logic OR 222 will conditionally assert signal SD_1Q, e.g., provide a logic high value, or negate signal SD_1Q based upon the value SAF_1. In particular, negated (logic low) value of SAF_1 indicates that address qualification of a stack access request based upon the address range DTAR 81 is to be performed by the address messaging detect module 624 to determine whether a DTM is to be generated or prevented (i.e., address qualification is performed, regardless of whether the access is a stack access request); while an asserted (logic high) value of SAF_1 indicates that no DTM is to be generated based upon DTAR 81 for a stack access request.

Thus, the signal DTM_EN is negated, e.g. a logic low, during a stack access in response to SAF_1 being asserted; and the comparison implemented by the comparator 211 of the address messaging detect module 624 is not needed, and therefore, can be disabled by virtue of being irrelevant to the state of DTM_EN. However, in response to SAF_1 being negated, the signal DTM_EN will be either asserted or negated during a stack access based upon the signal ADDR_MATCH_1 as generated by comparator 211.

It will be appreciated that the stack messaging enable module 626 does not use address range information stored at registers 81-83 to determine when an access to the stack is occurring. Instead, other resources of the data processor 10 are monitored to determine when an access request is to a stack location. Various techniques that can be used to determine whether memory stack locations are being accessed including: 1) detection of a command being executed that is dedicated to accessing information at a memory stack, such as a POP or a PUSH opcode; 2) detection based upon a dedicated hardware resource of the data processing module 10 being used responsive to the current access request; for example, in response to the use of a register that is dedicated to storing a pointer to the memory stack, or in response to information being provided from, or received at, a port that is dedicated to providing or receiving information from the memory stack, e.g., such as a dedicated port of the load/store module 28 or of the execution units 24. In an alternate embodiment, logic as described with respect the stack access detect module 62 can be used to prevent a DTM from being generated in response to an indicated register being used as an index register, e.g., a register that contains a value, such as a pointer or an index, that is added to another value to generate an effective address. In this embodiment, the indicated register can include one or more registers, such as general purpose registers, identified by the user, even though an indicated register may not be dedicated to supporting stack accesses. For, example, an indicator(s) can be set by the user to indicate one or more general purpose registers that are accessed to generate an effective address will be treated in the same manner as stack accesses as described herein.

In executing a certain software applications and processes, data processor system 10 may use one or more threads, also referred to processes, each of which can have one or more associated memory stacks. In a particular embodiment of the present disclosure, the data processor 10 provides hardware support for processing multiple independent threads, and whether stack access filtering is to be controlled by SAF_1, as described above, can be qualified by whether or not the thread ID associated with a particular access request is stored in storage location 312. One way for the data processor 10 to provide hardware support is to have logic that associates an instruction being executed, and its access requests, with a particular thread identifier, e.g., the PID stored at PID register 19.

Figure 5:
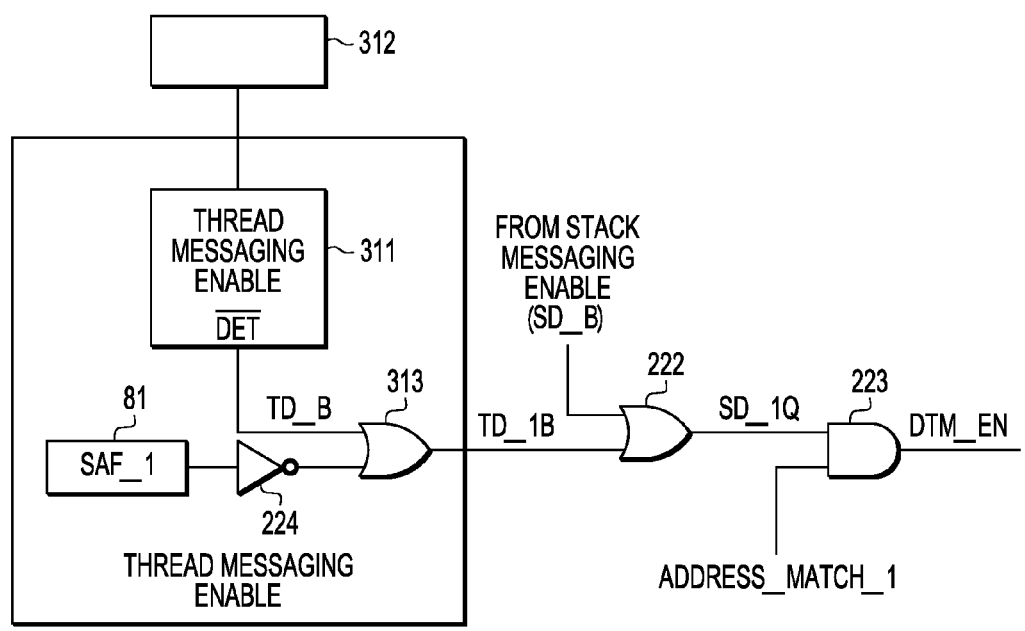
FIG. 5 illustrates in block diagram form a portion of FIG. 2 in greater detail in accordance with a specific embodiment of the present disclosure.

FIG. 5 illustrates a portion of a particular embodiment of the trace message request module 62 of FIG. 4 that includes a thread messaging enable module 311 that determines if a current access request belongs to a thread that is identified in a storage location 312, where thread identifiers stored at storage location 312 are programmable, e.g., user defined. If it is determined by the thread messaging enable module 311 that a current access request is associated with a thread that meets a membership criteria with respect to the threads listed in storage location 312, the value SAF_1 will enable/disable whether stack accesses can result in the generation of DTMs based upon the address messaging enable module 624 as described herein. Otherwise, if it is determined by the thread messaging enable module 311 that a current access request does not meet the membership criteria, DTM generation for all access requests, including stack accesses, will be determined by the address messaging enable module applying the DTAR address range criteria, irrespective of a state of SAF_1.

For example, a membership criteria can be met when a thread is a member of a set of threads listed at storage location 312. Alternatively, the membership criteria can be met when the thread is not a member of the set of threads listed at storage location 312. Membership criteria, such as inclusivity with respect to the storage location 312, can be programmable. Therefore, when a stack access is associated with a thread that meets the membership criteria, whether a DTM messages for the stack access is prevented, regardless of the address of the stack access, is conditional based upon SAF_1 by virtue of logic OR 313 receiving an asserted (logic low) signal TD_B and an asserted (logic low) signal SD_B. Conversely, when the current access request does not meet the membership criteria the value SAF_1 has no control over whether a DTM message is generated, by virtue of signal TD_B being negated (logic high). E.g., it is not possible to prevent stack access from generating a DTM by virtue of asserting SAF_1.

It will be appreciated that the process detect module 311 has been described as asserting signal TD_B, e.g., meeting the membership criteria, in response to the current thread being indicated in storage location 312. However, in other embodiments, the signal TD_B could be asserted in response to the current thread not being indicated in the storage location 312. Similarly, whether to qualify stack accesses by thread identifiers can also be enabled or disabled based upon a register control indicator, such as by an additional field of register 81 (not shown). Storage location 312 can include registers or memory that store programmable information that identifies threads of interest. The storage location 312 can be unique to DTAR 81, or can be a common register shared by all of the DTARs registers 81-83. In this manner, preventing a DTM from being generated based upon an access request to a memory stack location, as described above, can be implemented on a thread-by-thread basis.

By now it should be appreciated that there has been provided a method of preventing data trace information from being generated for a first data access request of a data processor responsive to the first data access request being an access request to a memory stack of the data processor that stores data (data stack) irrespective of an first address range that is provided to filter generation of data trace messages. It will be appreciated that many variations of determining an access request is a stack access are envisioned, including: determining the data access request is as stack access in response to a use of a resource that is dedicated to stack accesses; determining the first data access request is a stack access in response to a use of a hardware resource that is dedicated to stack accesses; determining the first data access request is a stack access response to the use of a register that is defined to contain a stack pointer; determining the first data access request is to a memory stack in response to information being accessed via a dedicated port, wherein the dedicated port can receive the information accessed from the stack pointer; determining the first data access request is a stack access in response to executing an opcode that is dedicated to accessing the memory stack; and the like.

In another variation, the above embodiment can also determine a process thread of the first data access request; determine whether the process thread is a member of a predefined set of process threads; and prevent the data trace information from being generated irrespective of the first address range in response to determining the process thread is a member of the predefined set of process threads. The predefined set of process threads can be user defined.

In another variation of the above embodiment, data trace information is prevented from being generated responsive to the first data access request being the access request to the data stack in response to determining a user programmable indicator indicates that address range filtering based upon an address of a stack is prevented, otherwise, determining whether to generate the data trace information based upon the address of the stack in response to determining the user programmable indicator indicates that address range filtering based upon an address of a stack is enabled.

In another variation of the above embodiment, data trace information is prevented from being generated responsive to the first data access request being the access request to the data stack irrespective of the first address range in response to a user programmable first indicator indicating that address range filtering based upon a stack access address is prevented, and preventing the data trace information from being generated is also irrespective of a second address range that is provided to filter generation of data trace messages in response to a user programmable second indicator indicating that address range filtering based upon the stack access address is prevented.

In another variation of the above embodiment, data trace information is prevented from being generated responsive to the first data access request being an access request to a data stack irrespective of the first address range in response to a user programmable first indicator indicating that address range filtering based upon the stack access address is prevented, and allowing generation of the data trace information based upon a second address range that is provided to filter generation of data trace messages in response to a user programmable second indicator indicating that address range filtering based upon the stack access address based on the stack access address is allowed.

In another embodiment, a method comprises determining that an address range provided to filter generation of data trace messages is to be ignored responsive to determining a data access is indexed by a value stored at a predefined storage location being used to determine an address of an access request. A variation of this embodiment is such that the predefined storage location is not a user selectable location. Another variation of this embodiment is that the predefined storage location is a general purpose register location that is identified as the predefined storage location by a user programmable value. Another variation of this embodiment is that it is determined that the address range is to be ignored responsive to a programmable indicator indicating that address range filtering of stack accesses is prevented, otherwise, responsive to determining the programmable indicator indicates that address range filtering of stack accesses is enabled, determining whether a data trace message is to be generated based upon the address range. According to another variation, it is determined, responsive to a process thread of the data access having a predefined identifier, that the address range provided to filter generation of the data trace messages is to be ignored.

In another embodiment a device comprises a first storage location to store an address range, a second storage location to store a filtering indicator, and filter logic. The filter logic comprises a comparator to compare the address range to an address of a data access request, and comprising stack access filtering logic to determine if the data access request is to a data stack of the device, and to prevent data trace message generation irrespective of a result from the comparator if it is determined the data access request is to the data stack, otherwise, if it is determined the data access is not to the data stack, the filter logic is to determine whether to prevent or generate the data trace message based upon a result of the comparator. A variation of this embodiment comprises logic to enable the stack filtering logic responsive to the data access request belonging to a predefined thread. According to another variation of this embodiment, the predefined thread is user programmable.

Thus, it is to be understood that the implementations depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the system of FIG. 1 can include multiple cores, such as other instantiations of the system of data processor 42 the various detect modules of trace message request module 62 can be duplicated for each DTAR, or can be multiplexed. It will also be appreciated that the function of various blocks and logic features as described herein may be implemented by different logic gates than those disclosed, or by other circuitry, such as instruction based state machines. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   storing a first address range that is used to qualify whether data trace information is to be stored at a trace buffer;
   generating a first data access request by a data processor to access a first storage location; and
   in response to the first storage location belonging to a memory stack of the data processor, not storing data trace information of the first data access request at the trace buffer irrespective of the first address range, otherwise,
   in response to the first storage location not belonging to the memory stack of the data processor, storing data trace information of the first data access request at the trace buffer in response to determining the first storage location is within the first address range.

2. The method of claim 1 further comprising: determining that the first storage location belongs to the memory stack in response to a resource of the data processor being used that is dedicated to stack accesses.

3. The method of claim 2, wherein the resource is a hardware resource of the data processor.

4. The method of claim 1 further comprising: determining the first storage location belongs to the memory stack in response to a register of the data processor being used that is defined to contain a stack pointer.

5. The method of claim 1 further comprising: determining the first storage location belongs to the memory stack in response to information being accessed via a dedicated port.

6. The method of claim 5 wherein the information being accessed via the dedicated port is a stack pointer.

7. The method of claim 1 further comprising determining that the first storage location belongs to the memory stack in response to determining that the data processor executing an opcode that is dedicated to accessing the memory stack.

8. The method of claim 1 further comprising: determining a process thread of the first data access request; determining whether the process thread meets a membership criteria with respect to a predefined set of process threads; and not storing data trace information of the first access request at the trace buffer irrespective of the first address range in response to determining the process thread meets the membership criteria.

9. The method of claim 1, wherein not storing the data trace information is further responsive to determining an indicator stored at a user programmable location indicates that address range qualification based upon the first address range is irrelevant for access requests to the memory stack, otherwise, in response to determining the indicator stored at the user programmable location does not indicate that address range qualification is based upon the first address range is irrelevant for access requests to the memory stack, determining whether to store the data trace information based upon first address range.

10. The method of claim 1 further comprising:
storing a first indicator, at a first user programmable location, that indicates data trace information is not to be stored for stack accesses; and
wherein not storing data trace information of the first data access request at the trace buffer irrespective of the first address range is further in response to the first user programmable location storing the first indicator.

11. The method of claim 1 further comprising:
determining a first indicator stored at a first user programmable location;
wherein not storing data trace information of the first data access request at the trace buffer irrespective of the first address range is further in response to the first indicator being an indicator that indicates data trace information is not to be stored for access requests to the memory stack location;
storing a second address range that is used to qualify whether data trace information is to be stored at the trace buffer;
determining a second indicator stored at a second user programmable location;
in response to the first storage location being the memory stack location of the data processor and the second indicator being an indicator that indicates data trace information is not to be stored for access requests to the memory stack location, not storing data trace information of the first data access request at the trace buffer irrespective of the second address range, otherwise,
in response to the first storage location being the memory stack location of the data processor and the second indicator not being an indicator that indicates data trace information is not to be stored for access requests to the memory stack location, storing data trace information of the first data access request at the trace buffer in response to determining the first storage location is within the second address range.

12. The method of claim 1, further comprising:
generating a second access request by a data processor to access a second storage location of the first address range; and
in response to the second storage location not belonging to the memory stack, storing data trace information of the second data access request at the trace buffer in response to determining the second storage location is within the second address range.

13. The method of claim 1, wherein the first storage location is within the first address range.

14. A method comprising:
generating a data access request to a memory location that is within an address range of addresses for which generation of data trace messages is enabled; and
preventing a data trace message for the data access request from being stored at a trace buffer in response to determining that an address of the data access request is based upon an index value stored at a predefined storage location, wherein the predefined storage location is a general purpose register location that is identified as the predefined storage location by a user programmable value.

15. A method of claim 14, wherein the predefined storage location is not a user selectable register location.

16. The method of claim 14, wherein preventing the data trace message for the memory location from being stored is further responsive to a programmable indicator being asserted, otherwise, in response to the programmable indicate being negated, determining whether the data trace message is to be stored is irrespective as to whether the address of the data access request was based upon an index value stored at the predefined storage location.

17. The method of claim 14 further comprising: determining, responsive to a process thread of the data access having a predefined identifier, that the address range does not enable generation of data trace messages.

18. A processor comprising:
a first storage location to store an address range;
a second storage location to store a filtering indicator; and
filter logic comprising a comparator to compare the address range to an address of a data access request of the processor, and comprising stack access filtering logic to determine if the data access request is to a data stack of the processor, and the filter logic to prevent data trace messages from being stored at a trace buffer irrespective of a result from the comparator if it is determined the data access request is to the data stack, otherwise, if it is determined the data access is not to the data stack, the filter logic is to determine whether to store or not store the data trace message at the trace buffer based upon a result of the comparator.

19. The device of claim 18, wherein the filter logic further comprises logic to enable the stack filtering logic responsive to the data access request belonging to a predefined thread.

20. The device of claim 19, wherein the predefined thread is user programmable.

* * * * *